(12) United States Patent
Mazyar

(10) Patent No.: US 9,005,446 B2
(45) Date of Patent: Apr. 14, 2015

(54) MAGNETIC MICRO- OR NANOPARTICLE ASSISTED FLUID SEPARATION

(75) Inventor: Oleg A. Mazyar, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 743 days.

(21) Appl. No.: 13/308,969

(22) Filed: Dec. 1, 2011

(65) Prior Publication Data

US 2013/0140240 A1 Jun. 6, 2013

(51) Int. Cl.
  *B01D 17/04* (2006.01)
  *B03C 1/01* (2006.01)
  *C02F 1/48* (2006.01)
  *B03C 1/28* (2006.01)
  *C02F 101/32* (2006.01)
  *C02F 103/10* (2006.01)

(52) U.S. Cl.
  CPC .............. *B01D 17/04* (2013.01); *B01D 17/047* (2013.01); *B03C 1/01* (2013.01); *C02F 1/48* (2013.01); *B03C 1/288* (2013.01); *B03C 2201/18* (2013.01); *C02F 2101/32* (2013.01); *C02F 2103/10* (2013.01)

(58) Field of Classification Search
  CPC ........ B01D 17/04; B01D 17/047; B03C 1/01; B03C 1/288; B03C 2201/18; C02F 1/48; C02F 2101/32; C02F 2103/10
  USPC .......................... 210/695, 671, 806, 222, 223; 252/62.51 R, 62.55, 62.56; 166/265
  See application file for complete search history.

(56) References Cited

U.S. PATENT DOCUMENTS 3,635,819 A * 1/1972 Kaiser ............................ 210/695
3,767,571 A * 10/1973 Lorenc et al. ................. 210/695
2012/0211428 A1 8/2012 Zahn et al.

OTHER PUBLICATIONS

Chul-Jin Choi et al., "Preparation and Characterization of magnetic Fe, Fe/C and Fe/N nanoparticles synthesized by Chemical vapor Condensation Process", Rev, Adv. Mater. Sci. 5 (2003), pp. 487-492.
Krishna N. K. Kowlgi et al. , "Synthesis of Magnetic Noble Metal (Nano) Particles", Langmuir, 2011, 27 (12), pp. 7783-7787.
L. S. Panchakarla et al., "Carbon nanostructures and graphite-coated metal nanostructures obtained by pyrolysis of ruthenocene and ruthenocene-ferrocene mixtures", Bull. Mater. Sci., vol. 30, No. 1, Feb. 2007, pp. 23-29.
Sheng Peng et al., "Synthesis and Stabilization of Monodisperse Fe Nanoparticles", J. Am. Chem. Soc., 2006, 128 (33), pp. 10676-10677.
Taek-Soo Kim et al. , "Microstructure of Fe Nanoparticles Fabricated by Chemical Vapor Condensation", Rev. Adv. Mater. Sci. 5 (2003), pp. 481-486.

(Continued)

*Primary Examiner* — David A Reifsnyder
(74) *Attorney, Agent, or Firm* — Cantor Colburn LLP

(57) ABSTRACT

A fluid separation system including a fluid mixture including a first fluid component dispersed in a second fluid component. A plurality of micro- or nanoparticles is operatively arranged in the fluid mixture to stabilize the fluid mixture by adhering to interfaces of the first fluid component. A magnetic element is operatively arranged for forming a magnetic field through the fluid mixture. The micro- or nanoparticles are magnetically responsive to the magnetic field for urging the first fluid component in a direction defined by the magnetic field. A method of separating fluids is also included.

20 Claims, 1 Drawing Sheet

(56) References Cited

OTHER PUBLICATIONS

Wenli Pei et al., "Controlled monodisperse Fe nanoparticles synthesized by chemical method", Magnetics, IEEE Transactions on, Oct. 2005 vol. 41, Issue, 10, pp. 3391-3393.

Massachusetts Institute of Technology, [online]; [retrieved on Sep. 12, 2012]; retrieved from the Internet http://web.mit.edu/newsoffice/2012/how-to-clean-up-oil-spills-0912.html. Larry Hardesty, MIT News Office, "How to clean up oil spills," MIT news, Sep. 12, 2012, 2p.

* cited by examiner

MAGNETIC MICRO- OR NANOPARTICLE ASSISTED FLUID SEPARATION

BACKGROUND

Fluid separation plays an important role in the downhole drilling and completions industry. Downhole formations typically contain a mixture including both a desirable fluid component, e.g., oil or hydrocarbons, and an undesirable fluid component, e.g., water or brine. So-called inflow control devices and other systems for separating fluid components are ubiquitously used in order to increase the cost effectiveness of a well, reduce wear on equipment, etc. Such devices work well for their intended use but variations in particular wells is an ever present moving target. Accordingly, improvements and/or alternatives in fluid separation technologies are always well received.

BRIEF DESCRIPTION

A fluid separation system, including a fluid mixture including a first fluid component dispersed in a second fluid component; a plurality of micro- or nanoparticles operatively arranged in the fluid mixture to stabilize the fluid mixture by adhering to interfaces of the first fluid component; and a magnetic element operatively arranged for forming a magnetic field through the fluid mixture, the micro- or nanoparticles magnetically responsive to the magnetic field for urging the first fluid component in a direction defined by the magnetic field.

A method for separating fluids including dispersing a plurality of micro- or nanoparticles in a fluid mixture, the fluid mixture including a first fluid component dispersed in a second fluid component; stabilizing the fluid mixture by adhering the micro- or nanoparticles to interfaces of the first fluid component; and subjecting the fluid mixture to a magnetic field, the micro- or nanoparticles magnetically responsive to the magnetic field and urging the first fluid component in a direction defined by the magnetic field.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
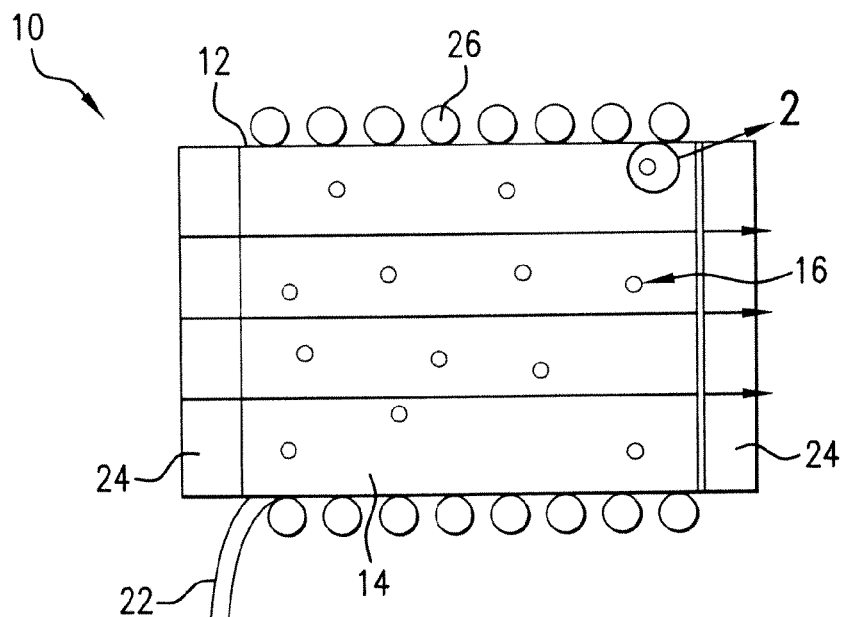
FIG. 1 schematically illustrates a system for separating two fluid components of a fluid mixture.

Referring now to FIG. 1, a system 10 is shown, in which a fluid supply 12 includes a first fluid component 14 and a second fluid component 16. The fluid supply 12 could be, or be defined by, a downhole annulus, reservoir, formation, tubular, etc. In other embodiments, fluid separation does not occur downhole, but in some other suitable location. For the sake of discussion, the fluid component 14 is referred to as forming a continuous phase for the fluid mixture or dispersion, while the second fluid component is referred to as forming a dispersed phase for the fluid mixture or dispersion. In some embodiments, the first and second fluid components are liquids and the mixture they form is an emulsion. In one embodiment, the fluid components 14 and 16 are water and oil, not necessarily respectively. Any pair of polar and non-polar or generally immiscible fluid components, or other mixtures capable of forming a dispersion, emulsion, aerosol, etc., will suffice in various embodiments. Because the fluid components 14 and 16 are immiscible (or do not homogeneously mix, etc.), the second component 16 in the dispersion in the fluid supply 12 takes the form of a plurality of particles or units dispersed throughout the fluid component 14. For the purposes of discussion herein, the term "unit" will refer to the bodies of the fluid component 16 dispersed throughout the continuous component 14, and could be, e.g., a droplet, particle, micelle, molecule, etc. or groups or combinations thereof.

Generally one fluid component in an emulsion or other fluid mixture (e.g., oil in an oil-water mixture) will coalesce in order to reduce the energy of the system. However, in actuality, for example in a downhole environment, turbulence, agitation, flow, movement, etc. of the fluids prevents coalescence. Additionally, the presence of dirt, sediment, contaminants, particles, emulsifying agents (e.g., from drilling mud), or other substances in the fluid, can further agitate the fluid mixture, chemically alter the mixture, and/or otherwise prevent coalescence. As one example, a Pickering emulsion results when certain solid particles added to an emulsion stabilize the emulsion by adsorbing or adhering to, or gathering at, the interface between the two fluid components about each unit of the dispersed fluid component. The stabilization by the solid particles lowers the energy of the system, thereby preventing the dispersed fluid from coalescing and maintaining the one fluid dispersed as units throughout the other fluid. Similar phenomenon can occur when certain solid particles are added to an aerosol. In view of the foregoing, instead of coalescing into distinct fluid components, fluid mixtures tend to remain with one fluid component dispersed in the other, making collection of one as opposed to the other difficult.

Figure 2A:
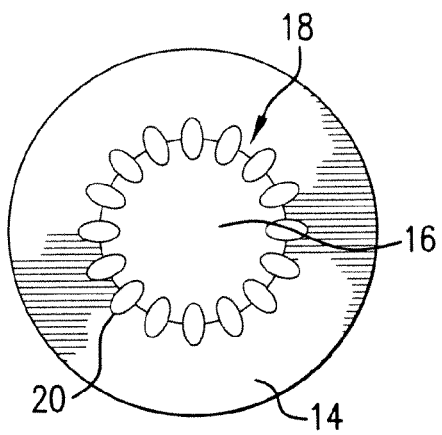
FIG. 2A schematically illustrates a unit or particle of a dispersed phase of the mixture of FIG. 1 encapsulated by a plurality of micro- or nanoparticles.

According to the current invention as described herein, the tendency of certain solid particles to stabilize fluid mixtures, (e.g. form Pickering emulsions), which stabilization prevents coalescence of fluid components and therefore seemingly hinders fluid separation, can be used to advantageous effect in separating two fluids. FIG. 2A schematically illustrates one unit of the fluid component 16 after a plurality of micro- or nanoparticles 20 have been added to the fluid supply 12. That is, the micro- or nanoparticles 20 could include any combination of microparticles and/or nanoparticles that suitably stabilize a dispersion. The micro- or nanoparticles 20 are shown gathered at and adsorbed to an interface 18 between the fluid components 14 and 16 in order to stabilize the fluid dispersion, e.g., forming a Pickering emulsion. That is, the micro- or nanoparticles 20 essentially form a thin layer at least partially encapsulating or surrounding each unit of the dispersed fluid component 16. The micro- or nanoparticles 20 could be hydrophobic, hydrophilic, amphiphilic, etc. for assisting in the stabilization of mixtures formed from various fluid component combinations, e.g. oil dispersed in water, water dispersed in oil, etc. For example, hydrophilic, or water wettable particles more readily stabilize mixtures in which the continuous fluid component 14 is water, while hydrophobic or oil wettable particles more readily stabilize mixtures in which the continuous fluid component 14 is oil. The micro- or nanoparticles 20 can additionally be functionalized with hydrophobic functional groups, hydrophilic functional groups, or both in order to assist in stabilization. In this way, the micro- or nanoparticles 20 can be specifically tailored to stabilize various fluid mixtures, e.g., oil-in-water, water-in-oil, etc. It is to be appreciated that the depiction of the micro- or nanoparticles and fluid components is for the sake of discussion only and that their actual or relative sizes, shapes, orientations, etc. could be different than those shown herein. It is also to be appreciated that the term nanoparticle includes any other suitable particle, powder, or structure capable of stabilizing an emulsion or other dispersion.

Figure 2B:
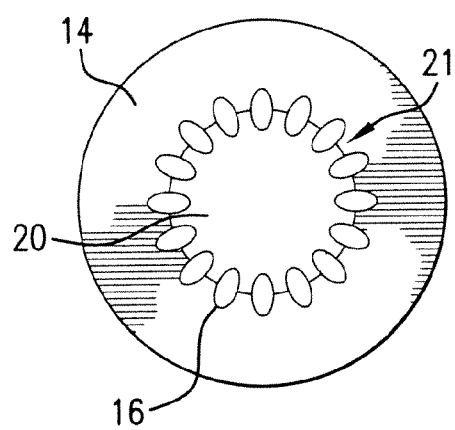
FIG. 2B schematically illustrates a plurality of units or particles of a dispersed fluid phase adhered to a magnetic micro- or nanoparticle.

In some embodiments the micro- or nanoparticles 20 are greater in size than the units of the dispersed fluid component 16, e.g., if the fluid component 16 comprises a molecule or a cluster of molecules. For example, FIG. 2B schematically illustrates another example of the interaction of the micro- or nanoparticles 20 with the fluid component 16. FIG. 2B schematically resembles FIG. 2A, with the exception of the reference numerals used respectively therein, as the physical relationships between the elements are changed. In the embodiment of FIG. 2B, the micro- or nanoparticle 20 is greater in size than the units of the dispersed fluid component 16. Accordingly, the units of the fluid component 16 may adhere or adsorb to an interface 21 between the micro- or nanoparticle 20 and the fluid component 14, e.g., at adsorption sites on the micro- or nanoparticle 20.

The micro- or nanoparticles 20 are deliverable to the fluid supply 12 in any desired way. For example, the nanoparticles could be pumped to the fluid supply 12 via a line 22 (see FIG. 1) while suspended in or propelled by a fluid medium, e.g., air, water, etc. This fluid medium could simultaneously disperse the micro- or nanoparticles 20 and agitate the fluid supply 12 for assisting in the distribution of the micro- or nanoparticles 20 and the fluid component 16 throughout the fluid component 14. A physical agitator, e.g., a screw, blade, stirrer, etc. could be included to assist in the agitation of the fluid components 14 and 16 and dispersing of the micro- or nanoparticles 20, if needed.

The system 10 further includes a magnetic element for creation of a magnetic field B. Two such examples are given in FIG. 1, namely, magnets 24 disposable on one or both sides of the supply 12 and a conductive coil 26, which, e.g., is wrapped around the fluid supply 12 arranged for a current to be passed therethrough for producing the magnetic field B. For example, the fluid supply 12 could be the inner chamber of a tubular with the coil 26 wrapped around the tubular, disposed in a wall of the tubular, etc. Of course, these magnetic elements, or any other element suitable for creating a magnetic field could be used, e.g., taking the form of electromagnets, permanent magnets, etc. In one embodiment, the magnetic field is naturally occurring, e.g., by the earth or surrounding formation in a downhole environment, and the fluid supply 12 is subjected to the magnetic field by simply being positioned downhole.

Advantageously, by making the micro- or nanoparticles 20 magnetic, the micro- or nanoparticles 20 are responsive to the magnetic field B. Thus, subjecting the micro- or nanoparticles 20 to the magnetic field B, will exert a force, e.g., attractive or repulsive, on each micro- or nanoparticle 20 in a direction generally defined by that of the magnetic field. In response to the magnetic field B, the attraction between the micro- or nanoparticles 20 and the units of the fluid component 16 will cause the micro- or nanoparticles 20 to pull, push, force, carry, or otherwise urge the units of the fluid component 16 in the direction defined by the magnetic field.

The micro- or nanoparticles 20 could be any type of magnetic particle, e.g., ferromagnetic, ferrimagnetic, superparamagnetic, paramagnetic, diamagnetic, etc. In one embodiment, the micro- or nanoparticles 20 are iron, iron-carbon, and/or iron-nitrogen nanoparticles synthesized or prepared by chemical vapor condensation as described in Chul-Jin Choi, Byoung-Kee Kim, Oleg Tolochko and Li-Da, "Preparation and Characterization of Magnetic Fe, Fe/C and Fe/N Nanoparticles Synthesized by Chemical Vapor Condensation Process", Reviews on Advanced Materials Science, vol. 5, pp. 487-492 (2003), or any other known or suitable process for creating magnetic nanoparticles, e.g., arc discharge, mechanical alloying, hydrogen plasma metal reaction, etc. In another embodiment, the micro- or nanoparticles 20 are magnetic noble metal nanoparticles, e.g., fabricated by conventional noble metal nanoparticle creation processes in the presence of a magnetic field as described in Krishna N. K. Kowlgi, Ger J. M. Koper, Stephen J. Picken, Ugo Lafont, Lian Zhang, and Ben Norder, "Synthesis of Magnetic Noble Metal (Nano) Particles", Langmuir, vol. 27, pp. 7783-7787 (2011). In another embodiment the micro- or nanoparticles 20 are carbon-decorated Co and/or FePt nanoparticles prepared as described in Norman A. Luechinger, Norman Booth, Greg Heness, Sri Bandyopadhyay, Robert N. Grass, and Wendelin J. Stark, "Surfactant-Free, Melt-Processable Metal—Polymer Hybrid Materials: Use of Graphene as a Dispersing Agent", Advanced Materials, vol. 20, pp. 3044-3049 (2008) and in Nick Caiulo, Chih Hao Yu, Kai Man K. Yu, Chester C. H. Lo, William Oduro, Benedicte Thiebaut, Peter Bishop, and Shik Chi Tsang, "Carbon-Decorated FePt Nanoparticles", vol. 17, pp. 1392-1396 (2007), respectively. Carbon coating generally improves the dispersal of inorganic nanoparticles, e.g., the nanoparticles 20, within hydrophobic liquids, e.g., oil. Moreover, carbon coating on magnetic metal or metal alloy nanoparticles enables further functionalization of these nanoparticles with hydrophilic and/or hydrophobic functional groups, if necessary, to adjust their wettability by the fluid components 14 and 16 and, thus, their binding strength to the interfaces 18 and 21 shown in FIGS. 2A and 2B, respectively. Of course any other process could be utilized for creating other types of magnetic micro- or nanoparticles, all of which are usable by the current invention as described herein.

Figure 3:
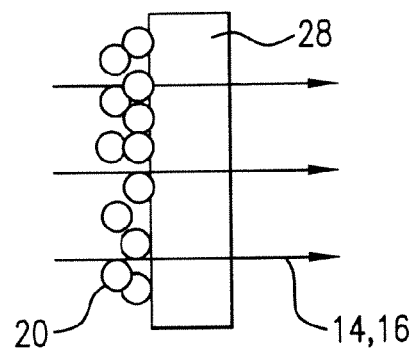
FIG. 3 schematically illustrates a filter for separating the micro- or nanoparticles from the units or particles of the dispersed phase of the mixture.

Eventually, due to the presence of the magnetic field, the micro- or nanoparticles 20 will urge the units of the fluid component 16 away from the fluid component 14, such that the fluid component 16 and the micro- or nanoparticles 20 can be siphoned off, gathered, collected, harvested, etc. For example, as shown schematically in FIG. 3, the micro- or nanoparticles 20 can be skimmed from the fluid supply 12 via a filter 28. The filter 28 is, for example, a foam screen or other filtration media that is arranged, e.g., with appropriately sized pores or openings, to enable passage of the fluid component 16 therethrough while impeding passage of the micro- or nanoparticles 20 or clusters thereof In another embodiment, the filter 28 skims the fluid component 16 and the micro- or nanoparticles 20 from the fluid component 14, and the micro- or nanoparticles 20 are separated from the fluid component 16 via some other method, e.g., heating in order to evaporate the fluid component 16 from the micro- or nanoparticles 20. Accordingly, the fluid component 16 can be separated from the fluid component 14 and directed to a desired location. For example, if the fluid component 16 is a hydrocarbon, it can be directed into a production tubular for production thereof, while if the fluid component 16 is aqueous, it can be directed back downhole into the formation. After filtering and collecting the fluid component 16, the micro- or nanoparticles 20 can be dispersed into a new fluid supply, or again into the fluid supply 12, e.g., by agitation of the fluid supply 12, in order to separate any remaining units of the fluid component 16 from the component 14.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A fluid separation system, comprising:
a fluid mixture including a first fluid component dispersed in a second fluid component;
a plurality of carbon coated and functionalized microparticles or nanoparticles operatively arranged in the fluid mixture to stabilize the fluid mixture by adhering to interfaces of the first fluid component; and
a magnetic element operatively arranged for forming a magnetic field through the fluid mixture, the carbon coated and functionalized microparticles or nanoparticles magnetically responsive to the magnetic field for urging the first fluid component in a direction defined by the magnetic field.

2. The fluid separation device of claim 1, wherein the fluid mixture is an emulsion.

3. The fluid separation device of claim 1, further comprising a filter operatively arranged for permitting passage of the first fluid component therethrough while impeding passage of the microparticles or nanoparticles for separating the microparticles or nanoparticles from the first fluid component.

4. The fluid separation device of claim 1, wherein the micro- or nanoparticles are reusable after being separated from the first fluid component by the filter.

5. The fluid separation system of claim 1, wherein the first fluid component comprises hydrocarbons and the second fluid component is aqueous.

6. The fluid separation system of claim 1, wherein the first fluid component is aqueous and the second fluid component comprises hydrocarbons.

7. The fluid separation system of claim 1, wherein one of the first and second fluid components is polar while the other is nonpolar.

8. The fluid separation system of claim 1, wherein the magnetic element comprises an electromagnet, a permanent magnet, a conductive coil, or combinations including at least one of the foregoing.

9. The fluid separation system of claim 1, wherein the microparticles or nanoparticles are metal alloy nanoparticles.

10. The fluid separation system of claim 1, wherein functionalization is for tailoring a wettability of the microparticles or nanoparticles.

11. The fluid separation system of claim 1, wherein the system is located downhole.

12. The fluid separation system of claim 1, wherein the interfaces are formed between the first and second fluid components and the microparticles or nanoparticles are adsorbed to the interfaces.

13. The fluid separation system of claim 1, wherein the interfaces are formed between the first fluid component and the microparticles or nanoparticles and the first fluid component are adsorbed to the interfaces.

14. A method for separating fluids comprising:
dispersing a plurality of carbon coated and funtionalized microparticles or nanoparticles in a fluid mixture, the fluid mixture including a first fluid component dispersed in a second fluid component;
stabilizing the fluid mixture by adhering the microparticles or nanoparticles to interfaces of the first fluid component; and
subjecting the fluid mixture to a magnetic field, the microparticles or nanoparticles magnetically responsive to the magnetic field and urging the first fluid component in a direction defined by the magnetic field.

15. The method of claim 14, further comprising collecting the first fluid component.

16. The method of claim 14, wherein collecting the first fluid component further comprises passing the first fluid component through a filter operatively arranged to impede passage of the microparticles or nanoparticles for separating the microparticles or nanoparticles from the first fluid component.

17. The method of claim 16, further comprising again dispersing the plurality of microparticles or nanoparticles in the fluid mixture for collecting more of the first fluid component.

18. The method of claim 16, further comprising dispersing the plurality of microparticles or nanoparticles in another fluid mixture.

19. The method of claim 14, wherein one of the first and second fluid components comprises a hydrocarbon and the other is aqueous.

20. The method of claim 14, wherein one of the first and second fluid components is polar and the other is nonpolar.

* * * * *